Figure 7:
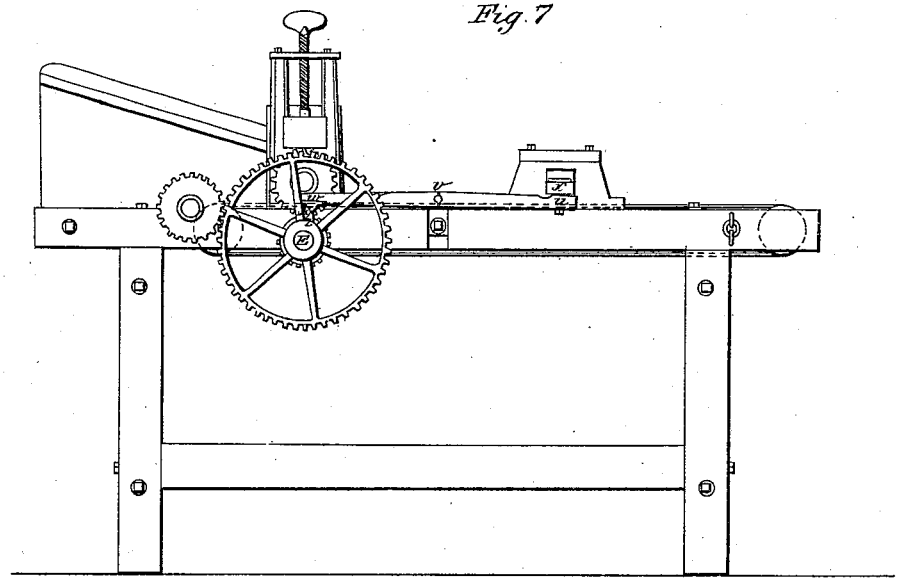

W. Perkins,
Cracker Machine,
Nº 2,029. Patented Apr. 2, 1841.
Sheet 1 - 2 Sheets
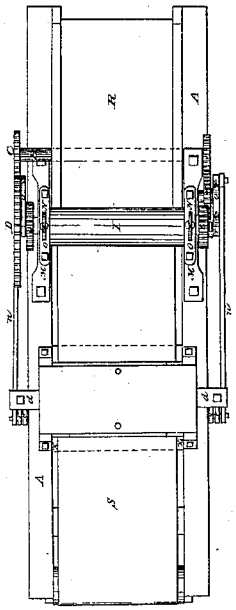
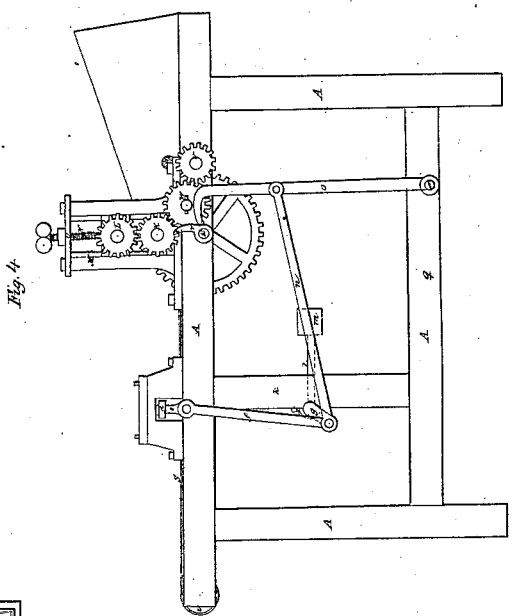
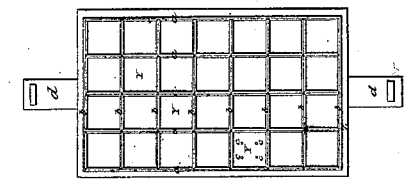
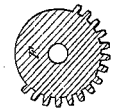
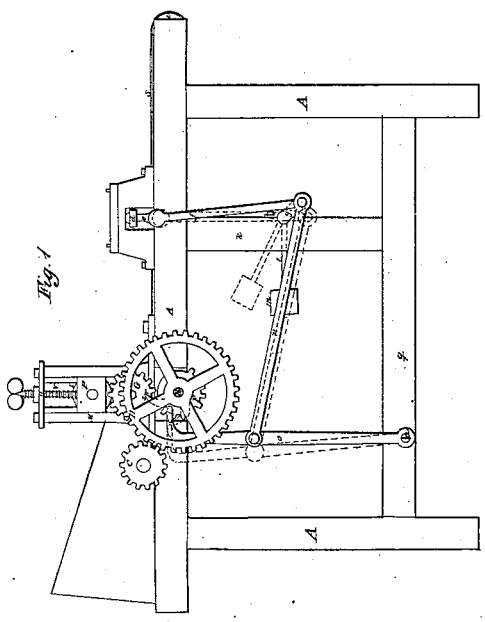
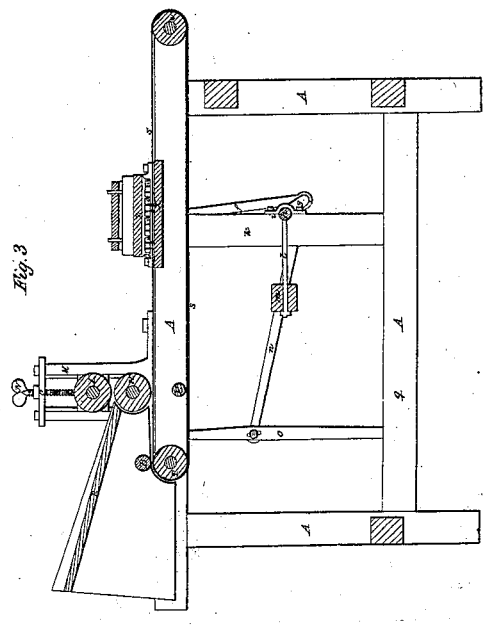

Sheet 2 - 2 Sheets.

W. Perkins,
Cracker Machine,

N° 2,029. Patented Apr. 2, 1841.

UNITED STATES PATENT OFFICE.

WM. PERKINS, OF BOSTON, MASSACHUSETTS.

MACHINERY FOR CUTTING CRACKERS.

Specification of Letters Patent No. 2,029, dated April 2, 1841.

*To all whom it may concern:*

Be it known that I, WILLIAM PERKINS, of Boston, in the county of Suffolk and State of Massachusetts, have invented new and useful Improvements in Machinery for Cutting or Shaping Crackers.

The said improvements, the principles thereof, and manner in which I have contemplated the application of said principle or character by which they may be distinguished from other inventions of a like nature, together with such parts or combinations I claim to be my invention and consider original and new I have herein described, which description taken in connection with the accompanying drawings herein referred to forms my specification.

Figure 1 represents a side elevation of my machine. Fig. 2, is a plan or top view. Fig. 3 is a longitudinal and vertical section. Fig. 4, is an elevation of the other side. Figs. 5, &c., represent views in detail of some of the parts which will be hereafter described.

In most if not all machinery for cutting soda biscuit or crackers as heretofore constructed there has been one prominent and radical defect viz. a movement of the dough forward, while the pricking points are in the same or vise versa, the effect of which is, (as dough is so soft and yielding a substance), generally to elongate the cracker, and thereby cause it to come from the machine in a rectangular instead of a square form—or otherwise so to deform its shape as to render it difficult to closely pack such kinds of bread in the boxes, in which the same are usually put up for preservation and sale. My machinery is intended to obviate this evil, and is thus arranged.

A A A, Figs. 1, 2, 3, &c., represent a framework of wood iron or other material suitably arranged, to support the operative parts of the machinery thereto attached. On the top and at a convenient part thereof a transverse shaft B, Figs. 1, 2, 3, revolves in proper boxes. This is the driving shaft to which the power that gives motion to the machinery is applied by a pulley and belt, a crank or in convenient manner. A cogged pinion C fixed on the shaft B, see Figs. 1, and 2, engages with and communicates motion to a geared wheel D on another transverse shaft E, Figs. 1, 2, 3, 4, the said shaft being supported in suitable bearings connected to the framework. A cogged pinion F, Figs. 1 and 5, having a portion of the teeth of its circumference removed as seen in Fig. 5 is placed on the shaft E in rear of the geared wheel D, and engages with a gear G on the extremity of the center shaft of the lower feed roller H, Fig. 3. Another feed roller I is arranged above the roller H, to which motion is given by a gear K fixed on the opposite end of the shaft of the roller H (see Fig. 4), engaging with a similar gear L placed above it, and on the adjacent end of the center shaft of the upper roller I. The bearings of the journals of the shaft of the lower draw rollers are fixed to upright standards or frames M M bolted to the top beams of the frame A, while those of the upper can be raised or lowered a short distance by screws N N working through or screwed into cross bars O, O of the tops of each of the standards M as seen in Fig. 1, where P is the bearing or box. The object of thus raising or lowering the upper roller is to regulate the thickness of the dough. An inclined plane R is arranged in the rear of the feed rollers H, I, on which the dough is laid, being drawn from thence by the action of said rollers and deposited in a thin sheet on an endless apron S, situated directly under the lower roller, and revolving over two cylinders or rollers T U, Fig. 3. The endless apron is put in motion by a gear wheel V, Figs. 2 and 4, on the end of the center shaft of the roller T engaging with the gear K on the shaft of the lower feed roller through the intervention of a connecting gear W interposed between them and engaging with each.

The apron S passes over the upper surface of a table X X X X, Fig. 2, and X, Fig. 3, situated between the feed rollers and the roller U, the stamping and pricking apparatus being situated above this table and brought down at regular intervals of time upon the sheet of dough as it passes on the apron S under the same. The stamping apparatus consists of a number of thin plates or knives *a, a, a,* Figs. 3, 6, placed parallel to each other at equal distances, with other knives *b b,* crossing them at right angles, and at the same distances apart as the former, so as to have equal square spaces Y Y Y, &c., between them. These knives are fixed to the lower side of a suitable rectangular block, plate or frame Z as seen in Fig. 3. The prickers or points

*c c*, together with whatever stamp it is desired to impress on the surface of the cracker, are inserted in the square spaces of the block or plate Z, between the knives in the usual manner. The knife frame Z has ears or projections *d d*, Figs. 1, 2, 4, on each end extending outward a short distance over the sides of the framework A A. Small pieces of metal *e, e*, Figs. 1, 4, extending downward from each ear, are jointed to the top of long vibrating rods *f, f*. The lower ends of the rods *f* are joined to cranks *g, g*, fixed on each end of a cross shaft *h*, Fig. 3, supported in suitable and substantial bearings *i, i*, bolted to the upright toes *k, k* of the frame A. From the center of the shaft *h* a rod *l* extends back, having a weight *m* on its outer ends which serves as a counterpoise to balance the knife frame and machinery connected thereto. To each of the cranks *g*, the end of a long rod *n* is jointed in any suitable manner, the other extremity of each of the rods *n* being jointed to an upright vibrating lever *o* at a convenient point thereon. The levers *o, o* move at their feet on screws *p, p*, by which they are confined to the lower cross beams *q, q* of the frame A A. The tops of these levers are bent over at right angles or thereabouts, so that their extremities may rest against cams *r r*, Figs. 1, 2, 4, fixed on the shaft E near each extremity thereof.

The cams *r, r* are so formed that as the shaft E revolves, they act against the bent end of the levers *o, o*, and force said levers backward, or into the position denoted by the dotted lines in Fig. 1. As the levers *o, o* are thus moved they draw upon the cranks *g, g* through the connecting rods *n, n*, and cause said cranks to move through a sector of a circle or be brought down, from an inclined to nearly a perpendicular position, as denoted by the dotted lines Fig. 1. As the cranks turn they move the shaft (to which they are connected, in its bearings—thus elevating the counterpoise weight *m*—and at the same time they draw or pull down the knife frame Z or stamping apparatus to which they are connected by the rods *f f* as before described.

The cranks *g, g* in combination with the rods *f, f*, form toggles or progressive levers, the rods *l, l* being pitmans to draw the same back, so that when the stamping apparatus descends on the sheet of dough, it is pressed down or through the same with great force, as the cranks *g, g* and rods *f, f* are brought toward a perpendicular position. The stamping apparatus having performed its office, as soon as the extreme end *s* of each cam *r*, has passed or acted on the bent ends of the levers *o, o*, the counterpoise weight *m* being relieved, falls and raises the stamping apparatus from the dough—at the same time bringing the rods *f, f* cranks *g, g*, rods *n, n*, and vibrating levers *o, o*, into the position denoted by the black lines in Figs. 1, and 4. Then as soon as the stamping apparatus is raised the arc of teeth of the pinion F—engage with those of the gear G— and thus give motion to the feed rollers H, I and endless apron S; which latter moves a distance forward equal to the width of the knife frame or stamping apparatus—carrying outward the dough previously stamped, and a fresh sheet of dough under the knife frame. Then the teeth of the pinion F leave those of the gear G, and the cams *r, r* immediately commence their action on the bent ends of the levers *o, o*. Therefore while the stamping apparatus performs its operation the pinion F does not turn the gear G, and the feed rollers and endless apron are stationary. From the above it will be easily apparent, that, during the action of the stamping apparatus on the dough, it, together with the feed rollers and endless apron, remain perfectly stationary, until the stamping apparatus has been raised upward by the counterpoise weight, which being fully accomplished, they are set in motion and carry a fresh quantity or sheet of dough under the knives—there to remain stationary until stamped, and to be moved out from under the same after the operation is completed as before described. The bread thus stamped will be perfect in shape and not elongated as is generally the case when stamped on cylindrical machinery.

Figure 8:
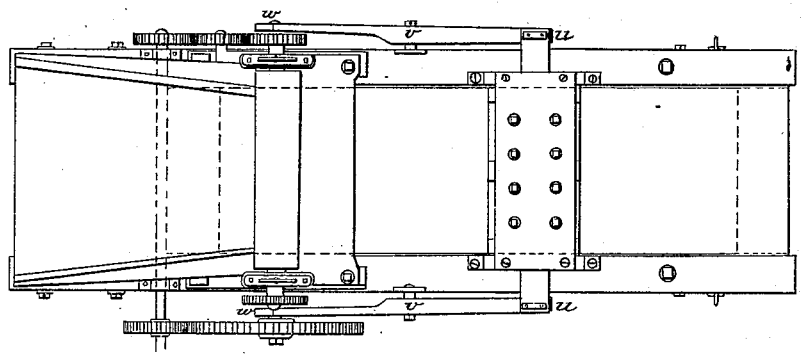

Instead of the upright levers *o, o* rods *n, n*, cranks *g, g* and rods *f, f*, interposed between the stamping apparatus and the cams *r, r*, levers *u v w*, Figs. 7 and 8, may be substituted. Each of these levers has its fulcrum at *v* and is properly connected at its end *u* to one of the ears or projections *x* of the stamping apparatus. The opposite end *w* has a rounded projection $y^3$ Fig. 7, on its lower side, which rests on a proper shaped cam *z* placed on the shaft E in lieu of the cam *r* before mentioned.

As the cams revolve they raise the end *w* of the lever *u v w* and of course depress the stamping apparatus—which should be raised by a spring or counterpoise weight properly arranged.

Having thus described my invention, I shall claim in the same—

1. The arrangement of machinery, which gives motion to the feed rollers and endless apron—in combination with the arrangement of machinery which operates the stamping apparatus, the whole being constructed substantially in the manner and for the purposes hereinbefore described.

2. I also claim, operating the feed rollers and endless apron so that they may be alternately at rest, and in motion, by means of a geared pinion (having a portion of the teeth of its circumference removed), in connection with the other machinery intervening between said pinion, feed rollers and apron; also operating the stamping apparatus by means of a cam or cams in connection with the toggles and other intervening machinery; the whole being constructed and arranged substantially as above set forth.

In testimony that the above is a true description of my said invention and improvement I have hereto set may signature this twentieth day of November, in the year eighteen hundred and forty.

WILLIAM PERKINS.

Witnesses:
   R. H. EDDY,
   EZRA LINCOLN, Jr.